US009396429B2

(12) United States Patent
Sato

(10) Patent No.: US 9,396,429 B2
(45) Date of Patent: Jul. 19, 2016

(54) SEMICONDUCTOR MEMORY DEVICE INCLUDING WIRELESS ANTENNA

(71) Applicant: KABUSHIKI KAISHA TOSHIBA, Minato-ku (JP)

(72) Inventor: Keisuke Sato, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/479,700

(22) Filed: Sep. 8, 2014

(65) Prior Publication Data

US 2015/0254547 A1    Sep. 10, 2015

Related U.S. Application Data

(60) Provisional application No. 61/950,554, filed on Mar. 10, 2014.

(51) Int. Cl.
*G06K 19/06* (2006.01)
*G06K 19/077* (2006.01)

(52) U.S. Cl.
CPC .... *G06K 19/07754* (2013.01); *G06K 19/07732* (2013.01); *G06K 19/07769* (2013.01); *G06K 19/07783* (2013.01)

(58) Field of Classification Search
CPC . G06K 19/07749; G07F 7/1008; B42D 15/10
USPC ........................................ 235/492, 487, 493
See application file for complete search history.

(56) References Cited

U.S. PATENT DOCUMENTS

| 7,566,001 | B2 * | 7/2009 | Yamazaki .......... G06K 19/0704 235/380 |
| 8,188,933 | B2 | 5/2012 | Nakamura et al. |
| 8,336,784 | B2 * | 12/2012 | Phillips ............ G06K 19/07345 235/492 |
| 8,378,917 | B2 | 2/2013 | Yoneda et al. |
| 8,517,280 | B2 * | 8/2013 | Owada ............. G06K 19/07784 235/451 |
| 2002/0175364 | A1 | 11/2002 | Ichige et al. |
| 2009/0267128 | A1 | 10/2009 | Maejima |
| 2009/0268522 | A1 | 10/2009 | Maejima |
| 2010/0033307 | A1 * | 2/2010 | Narendra et al. ............ 340/10.1 |
| 2010/0207195 | A1 | 8/2010 | Fukuzumi et al. |
| 2011/0284946 | A1 | 11/2011 | Kiyotoshi |
| 2012/0098728 | A1 | 4/2012 | Kato et al. |

FOREIGN PATENT DOCUMENTS

| JP | 2010-200309 | 9/2010 |
| JP | 2011-66628 | 3/2011 |

* cited by examiner

*Primary Examiner* — Karl D Frech
(74) *Attorney, Agent, or Firm* — Oblon, McClelland, Maier & Neustadt, L.L.P.

(57) ABSTRACT

According to one embodiment, a semiconductor memory device includes a memory, controller, wireless antenna, interface terminal, and board. The controller is electrically connected to the memory. The controller is capable of communicating with a first outside device. The wireless antenna includes a first pattern. The interface terminal is capable of electrically connecting a second outside device. The board includes the interface terminal. The memory and the controller are disposed in a first area of the board. The wireless antenna surrounds the first area. A projection of the first pattern overlaps the interface terminal.

16 Claims, 7 Drawing Sheets

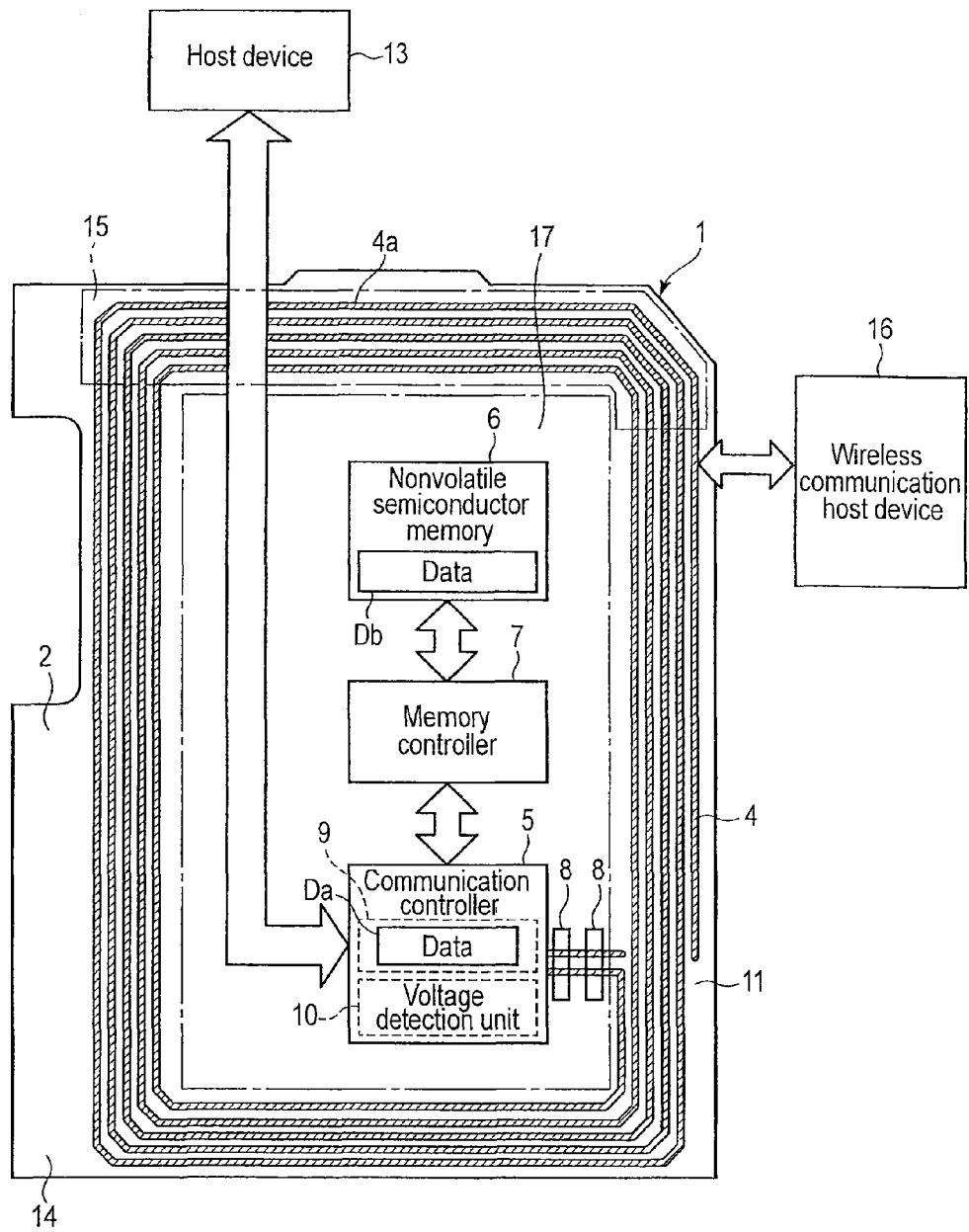
F I G. 1

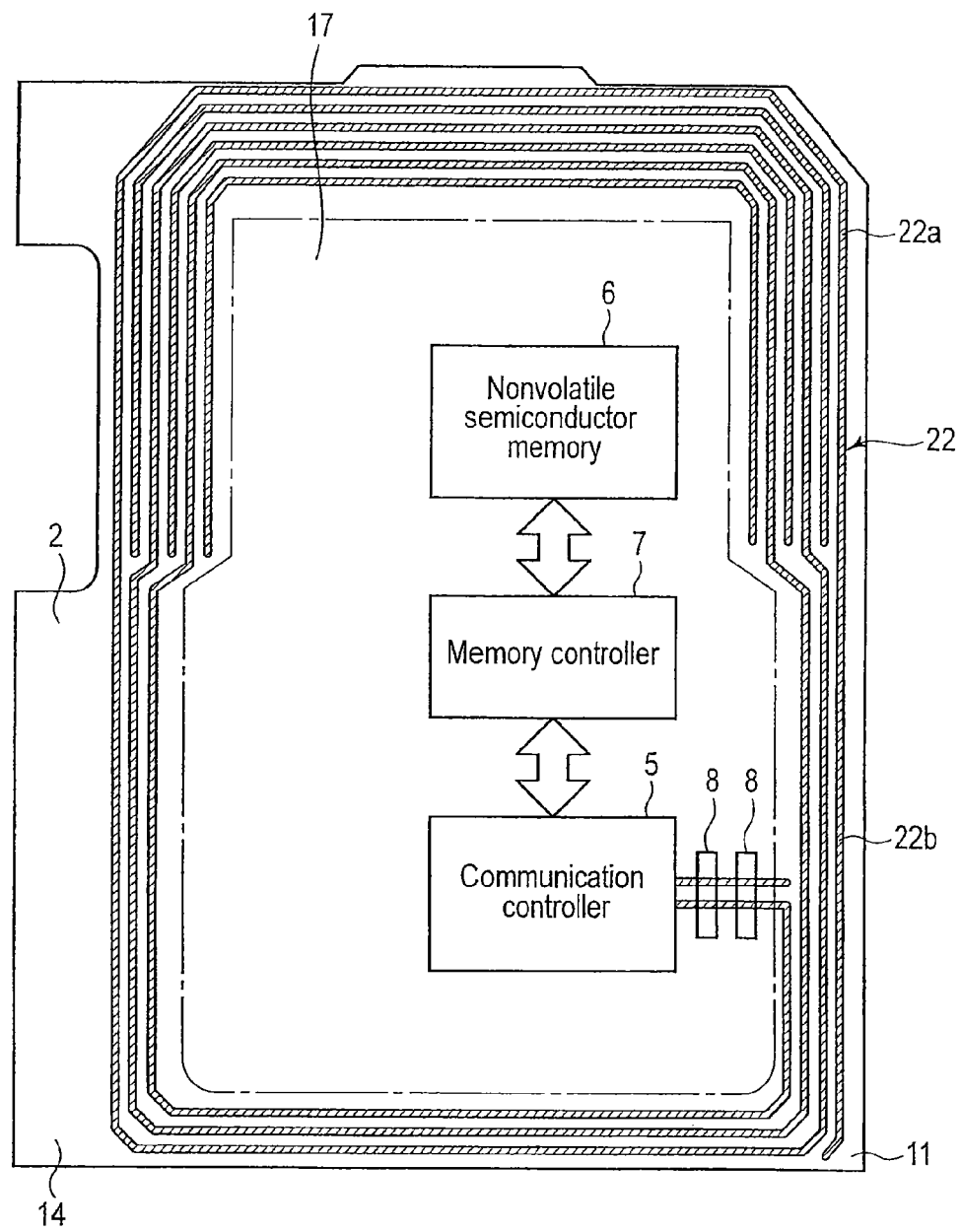
F I G. 6

SEMICONDUCTOR MEMORY DEVICE INCLUDING WIRELESS ANTENNA

CROSS-REFERENCE TO RELATED APPLICATIONS

This application claims the benefit of U.S. Provisional Application No. 61/950,554, filed Mar. 10, 2014, the entire contents of which are incorporated herein by reference.

FIELD

Embodiments described herein relate generally to a semiconductor memory device including a wireless antenna.

BACKGROUND

An example of a semiconductor memory device is a memory card. An example of the memory card is an SD card.

BRIEF DESCRIPTION OF THE DRAWINGS

FIG. 1 is a plan view illustrating an example of an arrangement state of a first plane of a semiconductor memory device according to a first embodiment;

FIG. 6 is a plan view illustrating an example of an arrangement state of a first plane of a semiconductor memory device according to a third embodiment.

DETAILED DESCRIPTION

Figure 2:
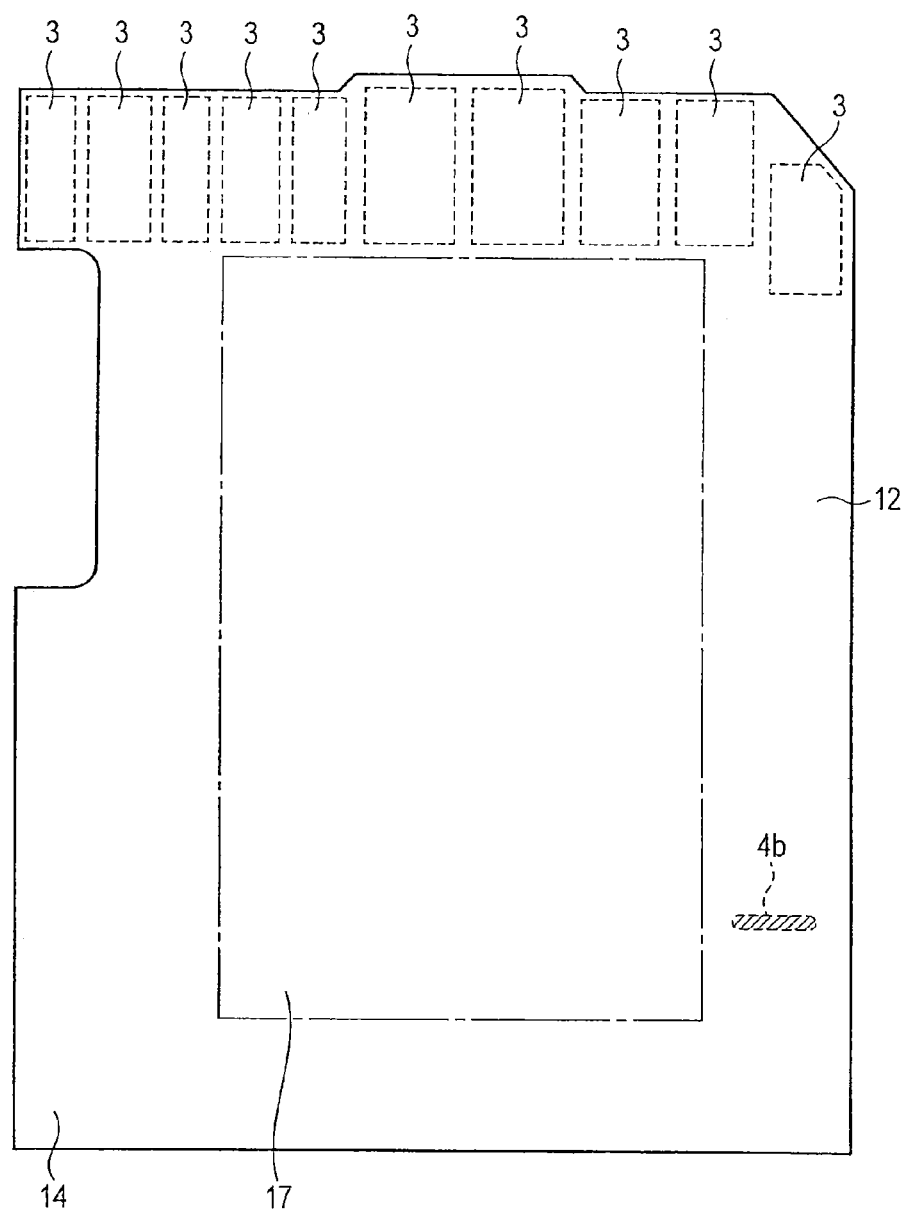
FIG. 2 is a plan view illustrating an example of an arrangement state of a second plane of the semiconductor memory device according to the first embodiment.

In recent years, a semiconductor memory device including a wireless communication function has become commercially available. There is a variety of wireless communication technologies applicable to any semiconductor memory device. One example is near-field communication (NFC), which uses a frequency of 13.56 MHz.

When the semiconductor memory device implements NFC technology, a loop wireless antenna is formed to induce a current in the wireless antenna by electromagnetic induction. For instance, the loop wireless antenna is generally formed on a polychlorinated biphenyl (PCB) board.

In the present embodiment, it may be defined that the loop wireless antenna generates electric power by a change of a magnetic flux density in an inside diameter space. For example, the loop wireless antenna may be an annular antenna, a spiral antenna, a coiled antenna, or a scroll antenna. The loop wireless antenna generates power using electromagnetic induction that occurs upon receiving a radio wave.

An increase in the area of an inner region of the loop wireless antenna and an increase in magnetic flux density within the inner region are important for an improvement of an NFC communication character. In other hand, it is necessary to consider arrangements of other components such as an implement part, signal line, a power line, and so forth to determine an arrangement (route) of a pattern of the wireless antenna.

Embodiments will be described hereinafter with reference to drawings. In the following description, the same reference numerals denote nearly the same functions and structure elements, and a repetitive description thereof will be given if necessary.

In the embodiments, a semiconductor memory device includes a memory, controller, wireless antenna, interface terminal, and board. The controller is electrically connected to the memory. The controller is capable of communicating with a first outside device. The wireless antenna includes a first pattern. The interface terminal is capable of electrically connecting a second outside device. The board includes the interface terminal. The memory and the controller are disposed in a first area of the board. The wireless antenna surrounds the first area. A projection of the first pattern overlaps the interface terminal.

First Embodiment

This embodiment explains a semiconductor memory device including a wireless communication function. The semiconductor memory device may be applied in various forms, including, for instance, a memory card (such as an SD memory card or a multimedia card) and a USB memory. It should be noted that the same structure as that of the semiconductor memory device according to the present embodiment may be applicable to a wireless communication device, such as a cellular telephone, for instance. The term "semiconductor memory device" is used here as a general term for a device or a system, including a semiconductor chip. In the following description, explanation will be given with taking a memory card as an example of the semiconductor memory device.

In the present embodiment, an instance in which NFC is used as the wireless communication function will be explained, however the instance is not limited, and may be other short-range wireless communication communicating by electric power generated by electromagnetic induction in the wireless antenna.

FIG. 1 is a plan view illustrating an example of an arrangement state of a first plane of a semiconductor memory device according to the present embodiment. The first plane is a mounting side.

FIG. 2 is a plan view illustrating an example of an arrangement state of a second plane of the semiconductor memory device according to the present embodiment. In FIG. 2, an underside arrangement state as seen from the first plane of FIG. 1 is illustrated by dotted lines to facilitate understanding of the underside arrangement state in relation to the arrangement state of the first plane illustrated in FIG. 1.

A semiconductor memory device 1 includes a board 2, interface terminals 3$s$, a loop wireless antenna 4, a communication controller 5, a nonvolatile semiconductor memory 6, a memory controller 7, and capacitors 8$s$.

The communication controller 5 includes a memory unit 9 and a voltage detection unit 10.

The communication controller 5 may be electrically connected to the memory unit 9. The communication controller 5 and the memory unit 9 may be separated from each other. The communication controller 5 and the memory controller 7 may be incorporated into a single controller.

The semiconductor memory device 1 includes a function writing data Db from the host device 13 and a function reading the data Db based on power supplied from the host device 13 which is electrically connected to the semiconductor memory device 1.

The semiconductor memory device 1 also includes functions of transmitting and receiving data Da with a wireless communication host device 16 based on power generated by electromagnetically induction in the loop antenna 4, even if the semiconductor memory device 1 is not electrically connected to other devices such as the host device 13 and the wireless communication host device 16 and thus is not supplied with power from the other devices. Namely, the semiconductor memory device 1 communicates at the frequency of 13.56 MHz in accordance with NFC, for instance, and transmits and receives the data Da to/from the wireless communication host device 16. Thus, the semiconductor memory device 1 is operable, even if it is not supplied with power from the host device 13.

The semiconductor memory device 1 transmits and receives the data Db to/from the host device 13 in accordance with an SD interface, for instance. However, the semiconductor memory device 1 uses a different interface. The semiconductor memory device 1 furthermore transmits and receives data to/from the wireless communication host device 16 in accordance with an NFC interface, for instance, but the other wireless communication interface may be used to the wireless communication.

In the present embodiment, the host device 13 and the wireless communication host device 16 are structurally separate from each other, but the host device 13 and the wireless communication host device 16 may be incorporated into a single structure.

The board 2 includes a mounting side 11 and a terminal side 12. The mounting side 11 and the terminal side 12 individually include an outer frame region 14 and an inner region 17 surrounded by the outer frame region 14. The mounting side 11 and the terminal side 12 are almost parallel with each other. In the present embodiment, explanation will be given with taking a case where the board 2 is a single board having two layered surface structure. However, the board 2 may have a surface structure including three or more layers. Each element provided on the mounting side 11 and terminal side 12 may be located on a different side if necessary. The board 2 is a PCB board, for instance.

The interface terminals 3s are formed at one edge of the terminal side 12 of the board 2. More specifically, the interface terminals 3s are formed along a short side of the board 2 on the terminal side 12. The interface terminals 3s are standardized terminals, for instance, and used to secure electric connection with the host device 13. When the semiconductor memory device 1 is an SD card, the interface terminals 3s are SD interface terminals.

The loop wireless antenna 4 is formed at the outer frame region 14 of the board 2. A projection of a part pattern 4a of the wireless antenna 4 overlaps the interface terminals 3s. In the present embodiment, a principal part of the wireless antenna 4 is formed at the outer frame region 14 of the mounting side 11. A by-pass part 4b of the wireless antenna 4 is formed on the terminal side 12.

The wireless antenna 4 is formed at the outer frame region 14 of the board 2, and includes the part pattern 4a overlapping the interface terminals 3s in the thickness direction of the board 2 and formed at the mounting side 11. In other words, the part pattern 4a of the wireless antenna 4 is formed at a region 15, in where the part pattern 4a overlaps the interface terminals 3s in a direction perpendicular to the mounting side 11 and the terminal side 12 via the board 2.

When the wireless antenna 4 receives an electric wave transmitted from the wireless communication host device 16, the wireless antenna 4 generates an electric current or a voltage by electromagnetic induction, and supplies generated power to the communication controller 5.

In the present embodiment, the wireless antenna 4 is set to a specific frequency or a specific frequency band in accordance with NFC. A shift of the frequency or the frequency band which is caused by the part pattern 4a of the wireless antenna 4 overlapping the interface terminals 3s in the thickness direction via the board 2, is adjusted by the capacitors 8s.

The wireless antenna 4 receives the data Da from the wireless communication host device 16, and transfers the data Da to the communication controller 5. Furthermore, the wireless antenna 4 receives the data Da from the communication controller 5, and transfers the data Da to the wireless communication host device 16. The wireless antenna 4 is a PCB pattern antenna, for instance.

The communication controller 5 is capable of communicating with the wireless communication host device 16. The communication controller 5 controls NFC for the wireless communication host device 16 using the wireless antenna 4. The communication controller 5 is operable using power generated by electromagnetic induction in the wireless antenna 4 based on the electric wave transmitted from the wireless communication host device 16. In the present embodiment, the communication controller 5 is located on the mounting side 11 within the inner region 17 surrounded by the outer frame region 14. However, the communication controller 5 may be located in the inner region 17 of the other side such as the terminal side 12. A part of the communication controller 5 may be located in the inner region 17 of the mounting side 11, and the other part of the communication controller 5 may be located in the inner region 17 of the terminal side 12.

The communication controller 5 receives a signal or data represented by the current or voltage generated at the wireless antenna 4 based on the electrical wave transmitted from the wireless communication host device 16, and operates in accordance with the signal or the data. For instance, the communication controller 5 writes the data Da to the memory unit 9 when receiving a write command and the data Da at a predetermined frequency conforming to NFC via the wireless antenna 4 from the wireless communication host device 16. Furthermore, the communication controller 5 reads the data Da written to the memory unit 9 when receiving a read command from the wireless communication host device 16 via the wireless antenna 4, and outputs the data Da to the wireless communication host device 16 via the wireless antenna 4.

More specifically, when the communication controller 5 receives a signal of a predetermined frequency conforming to NFC via the wireless antenna 4, the communication controller 5 becomes possible to communicate by NFC.

When writing to the nonvolatile semiconductor memory 6, the communication controller 5 receives the data Db via the interface terminals 3s from the host device 13 and transfers the data Db to the memory controller 7.

When reading from the nonvolatile semiconductor memory 6, the communication controller 5 receives the data Db from the memory controller 7 and transfers the data Db via the interface terminals 3s to the host device 13.

In a case where power is sufficient because the semiconductor memory device 1 is electrically connected to the host device 13, for instance, the communication controller 5 may write data via the memory controller 7 to the nonvolatile semiconductor memory 6, the data received via the wireless antenna 4 from the wireless communication host device 16.

In the case where power is sufficient, the communication controller 5 may read the data Db written to the nonvolatile semiconductor memory 6 via the memory controller 7, generate the data Da, and write the data Da to the memory unit 9.

In the case where power is sufficient, the communication controller 5 may read a part of or the whole of the data Db written to the nonvolatile semiconductor memory 6 via the memory controller 7, and transmit the read data via the wireless antenna 4 to the wireless communication host device 16.

The memory unit 9 is a low power consumption memory which is operable based on power generated by the wireless antenna 4. For instance, the memory unit 9 is a nonvolatile memory. The memory unit 9 stores the data Da under a control of the communication controller 5 or the memory controller 7. It should be noted that storing of the data Da by the memory unit 9 may be temporary. An electrically erasable programmable read-only memory (EEPROM) may be used as the memory unit 9, for instance, but various memories may also be used as the memory unit 9 in the same way as the case of the nonvolatile semiconductor memory 6.

As described above, the communication controller 5 and the memory unit 9 are operable based on power induced in the wireless antenna 4 by the wireless communication host device 16. Therefore, it is desirable that the communication controller 5 and the memory unit 9 should operate at low power in comparison with the memory controller 7 and the nonvolatile semiconductor memory 6. However, the communication controller 5 and the memory unit 9 may operate based on power supplied from the host device 13 when the power from the host device 13 is supplied to the semiconductor memory device 1.

The voltage detection unit 10 monitors a voltage supplied from the wireless antenna 4 to the communication controller 5 and, continues to output a reset signal of communication by NFC until a predetermined voltage has been reached. Therefore, an abnormal start or an abnormal operation of communication by NFC can be prevented.

A NAND flash memory may be used for the nonvolatile semiconductor memory 6, for instance, but some other nonvolatile semiconductor memories, including a NOR flash memory, a magnetoresistive random access memory (MRAM), a phase-change random access memory (PRAM), a resistive random access memory (ReRAM), a ferroelectric random access memory (FeRAM), may also be used.

The memory controller 7 controls writing and reading of the data Db to and from the nonvolatile semiconductor memory 6. The memory controller 7 may be located in the inner region 17 of the mounting side 11, may be located in the inner region 17 of the terminal side 12, or may be located in the inner regions 17 both of the mounting side 11 and the terminal side 12, as same as the communication controller 5. Specifically, the memory controller 7 writes the data Db to the nonvolatile semiconductor memory 6 when the memory controller 7 receives a write command and the data Db from the host device 13 through the interface terminals 3s and the communication controller 5. The memory controller 7 reads the data Db from the nonvolatile semiconductor memory 6, and transfers the data Db through the communication controller 5 and the interface terminals 3s to the host device 13 when the memory controller 7 receives a read command from the host device 13 through the interface terminals 3s and the communication controller 5.

When power of the memory controller 7 is sufficient because the semiconductor memory device 1 is electrically connected with the host device 16, for instance, the memory controller 7 may write data to the nonvolatile semiconductor memory 6, the data received from the wireless communication host device 16 via the wireless antenna 4 and the communication controller 5. When power of the memory controller 7 is sufficient, the memory controller 7 may transfer data to the wireless communication host device 16 via the communication controller 5 and the wireless antenna 4, the data read from the nonvolatile semiconductor memory 6.

The nonvolatile semiconductor memory 6 and the memory controller 7 operate based on power supplied from the host device 13.

For example, the capacitor 8 includes a first terminal and a second terminal. The first terminal is electrically connected to one terminal of the wireless antenna 4. The second terminal is electrically connected to the other terminal of the wireless antenna 4.

The capacitors 8s adjust a frequency of a current or a voltage generated at the loop antenna 4. Specifically, the capacitors Os adjust a frequency shift of NFC, the frequency shift occurring because the part pattern 4a of the wireless antenna 4 overlaps the interface terminals 3s in the thickness direction of the board 2 via the board 2.

The data Da may be data transmitted or received between the wireless communication host device 16 and the semiconductor memory device 1 in accordance with an NFC interface, for instance. Alternatively, the data Da may be characteristic data for the data Db to be written to the nonvolatile semiconductor memory 6, characteristic data which the communication controller 5 receives via the wireless antenna 4 from the wireless communication host device 16, characteristic data concerning the nonvolatile semiconductor memory 6, or characteristic data concerning the semiconductor memory device 1. More specifically, the data Da may be partial data (for instance, an initial or final portion) of image data written to the nonvolatile semiconductor memory 6, thumbnail data, management data of the data Db written to the nonvolatile semiconductor memory 6, a storage capacity of the nonvolatile semiconductor memory 6, a residual capacity of the nonvolatile semiconductor memory 6, a name of a file written to the nonvolatile semiconductor memory 6, a generation time of the data Db, photographing time data when the data Db is image data, or a count of the files written to the nonvolatile semiconductor memory 6.

In the present embodiment, a write instruction and data both from the host device 13 are first received by the communication controller 5, and then received by the memory controller 7. Because, at first, the communication controller 5 determines whether the write instruction and the data are transmitted from the host device 13 or the wireless communication host device 16, and change an operation according to the determined result.

In the following description, the difference between a pattern of a loop wireless antenna of a comparison example and a pattern of the loop wireless antenna 4 according to the present embodiment will be explained below.

Figure 3:
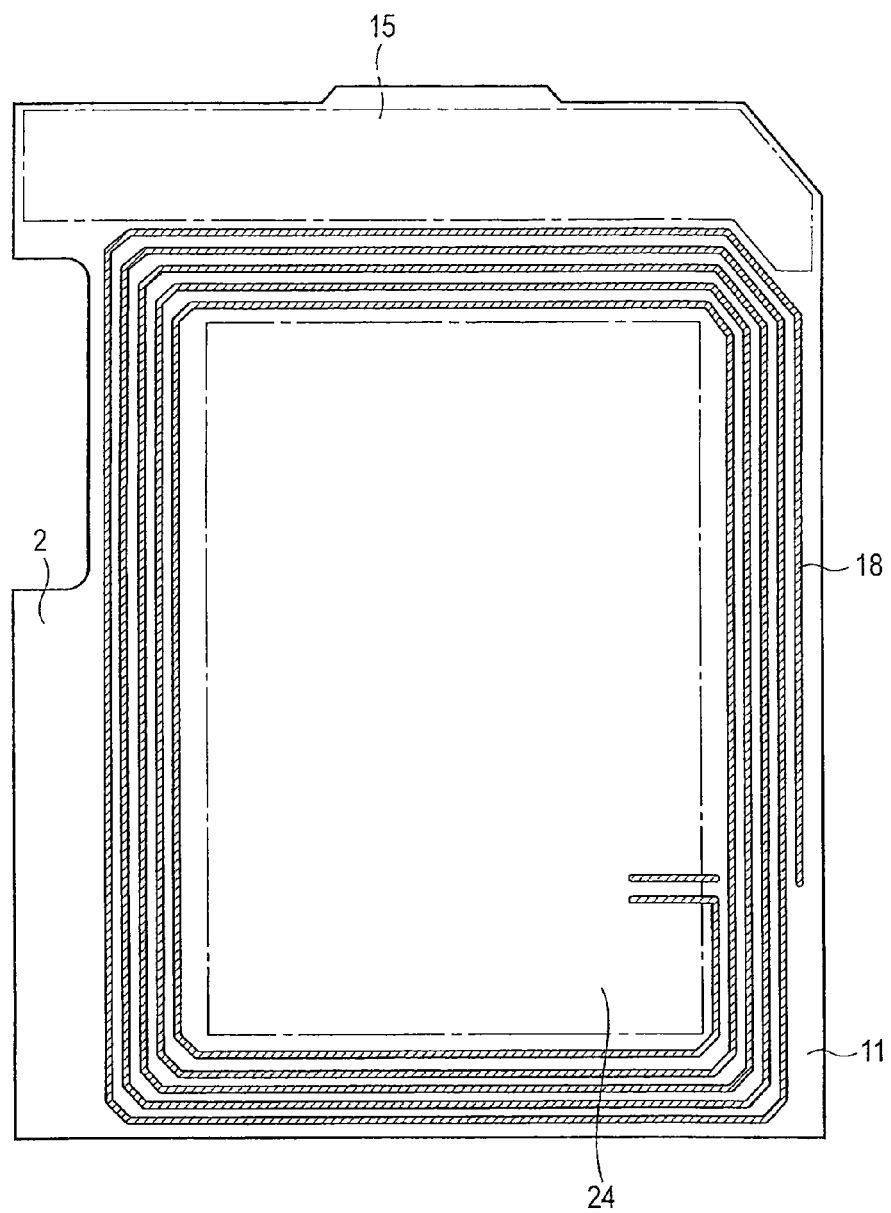
FIG. 3 is a plan view illustrating an example of a pattern of a loop wireless antenna of a comparison example.

FIG. 3 is a plan view illustrating an example of a pattern of a loop wireless antenna of a comparison example. In FIG. 3, other elements except a wireless antenna 18 and the board 2 are omitted.

The interface terminals 3s may be adversely affect a wireless characteristic because the interface terminals 3s are individually covered with metal. Therefore, the wireless antenna 18 illustrated in FIG. 3 are not formed in the region 15 of the mounting side 11 overlapping the interface terminals 3s in the thickness direction.

In contrast, the part pattern 4a of the wireless antenna 4 according to the present embodiment as illustrated in FIG. 1 and FIG. 2 is positively formed in the region 15 overlapping the interface terminals 3s via the board 2 in the thickness direction. Thus, the inner region 17 of the wireless antenna 4 can be made large in area. As the result, the magnetic flux passing through the inner region 17 can increase in NFC. The proportion of the area, which is a part of the inner region 17 and is occupied by metal, to the total area of the inner region 17 can reduce, resulting in improvement in the wireless characteristic. Since the shift of the NFC frequency caused by overlapping the part pattern 4a of the wireless antenna 4 and the interface terminals 3s in the thickness direction can be adjusted by the capacitors 8s, NFC can be suitably employed.

As has been explained above, the wireless antenna 4 is patterned to have a large inner region 17 in the present embodiment. Therefore, an increase in manufacturing cost can be prevented and sufficient communication performance can be secured.

If there is no need to adjust the frequency of the wireless antenna 4 in the present embodiment, the capacitors 8s may be eliminated. For instance, if the communication controller 5 internally includes a capacitor, or if tuning is established at a frequency of 13.56 Hz, the capacitors 8s may be eliminated.

Second Embodiment

A modified example of the first embodiment will be explained below as a second embodiment. In the present embodiment, a loop wireless antenna is formed in the outer frame region 14 of the mounting side 11 and a region of the outer frame region 14 of the terminal side 12 where the interface terminals 3s are not formed.

Figure 4:
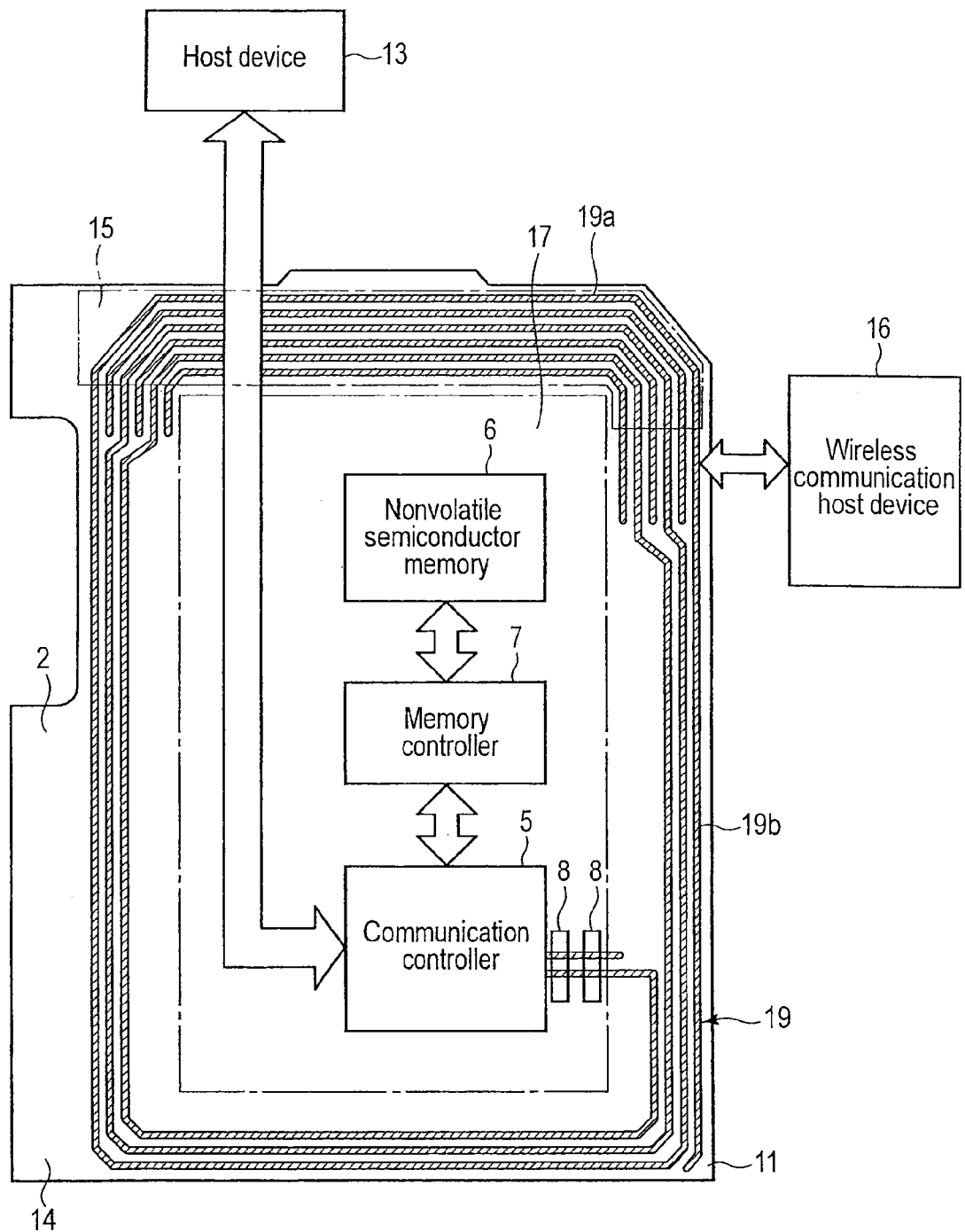
FIG. 4 is a plan view illustrating an example of an arrangement state of a first plane of a semiconductor memory device according to a second embodiment.

FIG. 4 is a plan view illustrating an example of an arrangement sate of a first plane of a semiconductor memory device according to a second embodiment. FIG. 4 corresponds to an arrangement state of the mounting side 11.

Figure 5:
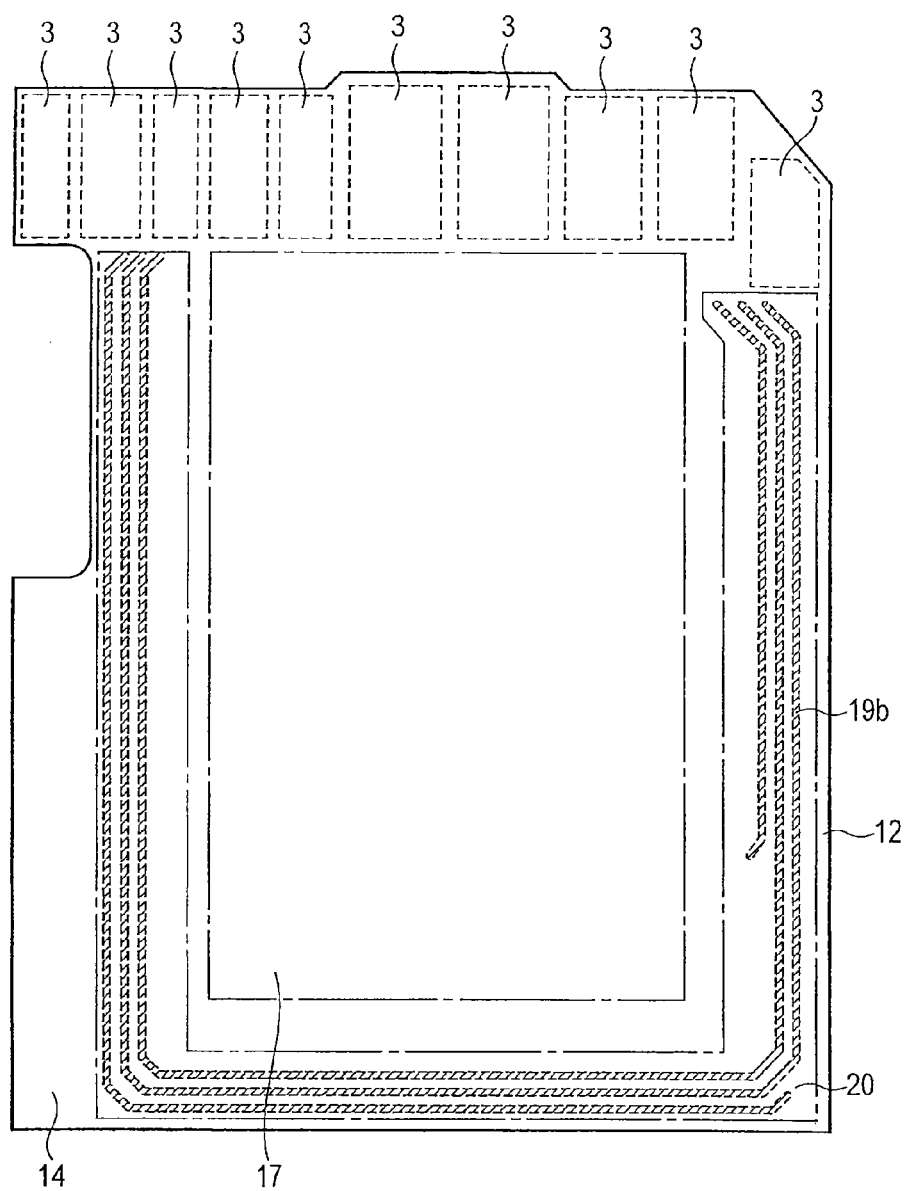
FIG. 5 is a plan view illustrating an example of an arrangement state of a second plane of the semiconductor memory device according to the second embodiment.

FIG. 5 is a plan view illustrating an example of an arrangement state of a second plane of the semiconductor memory device according to the second embodiment. In FIG. 5, an underside arrangement state as seen from the first plane of FIG. 4 is indicated by dotted lines to facilitate understanding of the relation to the first plane illustrated in FIG. 4.

A wireless antenna 19 includes part patterns. The following description will consider a wireless antenna 19 including a first part pattern 19a (simply called part pattern, too) and a second part pattern 19b (simply called part pattern, too). It should be noted that, although the present embodiment has only two part patterns, the number of part patterns is not limited to two, and it is possible for the wireless antenna 19 to include three or more part patterns.

A projection of the part pattern 19a of the wireless antenna 19 overlaps the interface terminals 3s. A projection of the part pattern 19b of the wireless antenna 19 does not overlap the interface terminals 3s. In other words, the part pattern 19b is formed without overlapping the interface terminals 3s and the projection of the interface terminal 3s. The part pattern 19b may be formed to planes of the board 2. The part pattern 19b is formed on the mounting side 11 of the board 2 and the terminal side 12 of the board 2.

The wireless antenna 19 is formed at the outer frame region 14. The part pattern 19a of the wireless antenna 19 is formed in the region 15 overlapping the interface terminals 3s via board 2 in the thickness direction.

In the present embodiment, the part pattern 19b of the wireless antenna 19 is further formed in a region 20, which is a part of the outer frame region 14 of the terminal side 12 and in where the interface terminals 3s are not formed. The part pattern 19b of the terminal side 12 is formed by the interface terminals 3s, and is derived to the mounting side 11 though the holes.

In the present embodiment, the wireless antenna 19 is formed on the mounting side 11 at the region 15, in where the wireless antenna 19 overlaps the interface terminals 3s in the thickness direction. The wireless antenna 19 is formed at both of the mounting side 11 and the terminal side 12 in the region where the wireless antenna 19 does not overlap the interface terminals 3s in the thickness direction. In other words, the wireless antenna 19 includes an antenna arrangement of a dual-sided (surface-back) of the board 2 and an antenna arrangement of a single-sided (the mounting side 11).

The present embodiment having been explained above makes it possible to maintain the same number of turns (inductance) as the first embodiment, and to further enlarge the area of the inner region 17 of the wireless antenna 19. More specifically, since the wireless antenna 19 in the present embodiment is distributed to plural sides, an area of each side which the wireless antenna 19 occupies can be made small whereas an area of the inner region 17 of the wireless antenna 19 can be made large.

Third Embodiment

A modified example of the second embodiment will be explained below as a third embodiment. In the present embodiment, a wireless antenna is not formed in a wire attachment region of a lead wire which includes the outer frame region 14 of the terminal side 12.

FIG. 6 is a plan view illustrating an example of an arrangement state of a first plane of a semiconductor memory device according to a third embodiment. FIG. 6 corresponds to an arrangement state of the mounting side 11.

Figure 7:
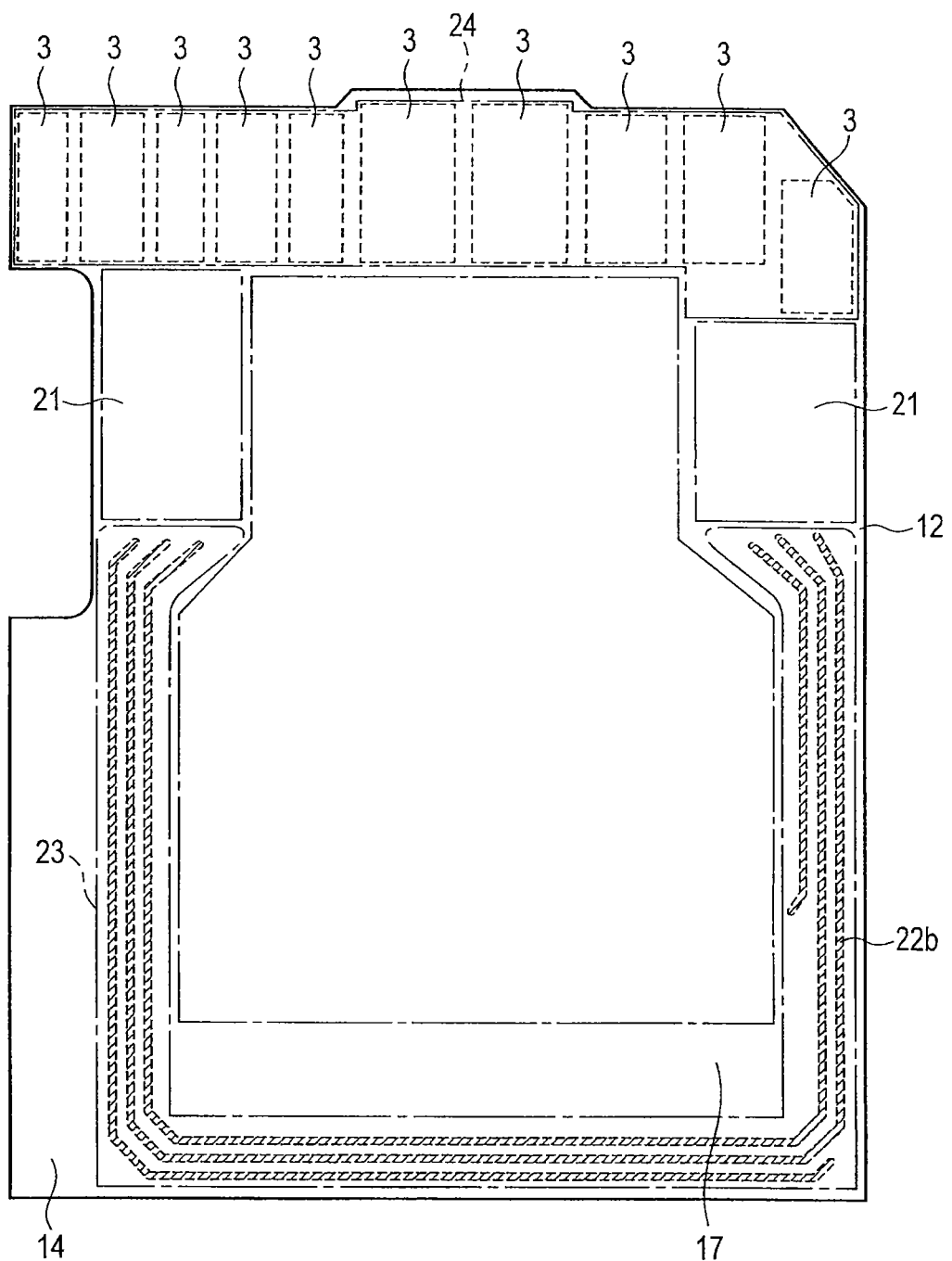
FIG. 7 is a plan view illustrating an example of an arrangement state of a second plane of the semiconductor memory device according to the third embodiment.

FIG. 7 is a plan view illustrating an example of an arrangement state of a second plane of the semiconductor memory device in the third embodiment. In FIG. 7, an underside arrangement state as seen from the first plane of FIG. 6 is indicated by dotted lines to facilitate understanding of the relation to the first plane illustrated in FIG. 6.

The terminals of mounting components, such as interface terminals 3s, are coated with metal in a manufacturing process. In the present embodiment, an explanation will be given by considering a case where an electric field gold plating processing is used as an example of an electric field metal plating processing, but the following explanation will also be applicable to other cases where a metal other than gold is used for an electric field plating processing.

In a case where electric field gold plating is applied to a production of a semiconductor memory device, for instance, lead wires are necessary to be connected to the respective plated positions to provide an external current to the respective interface terminals 3s.

In the present embodiment, wire attachment regions 21s of lead wires are formed in the outer frame region 14 of the terminal side 12 for forming the interface terminals 3s. In the present embodiment, the wire attachment regions 21s of lead wires are formed in the right and left of the terminal side 12 in the vicinity of the location where the interface terminals 3s are formed. More specifically, each wire attachment region 21 is disposed between a region 24 in which the interface terminals 3s are formed and a region 23 in which a part pattern 22b of the wireless antenna 22 is formed. The region 23 and the region 24 are arranged in the terminal side 12. However, it is possible to freely change the location where the wire attachment region 21 of the lead wire is formed. For instance, the wire attachment region 21 of the lead wire is formed to one of the right and the left of the terminal side 12.

A projection of a part pattern 22a of the wireless antenna 22 overlaps the interface terminals 3s and the wire attachment regions 21s. A projection of the part pattern 22b of the wireless antenna 22 does not overlap the interface terminals 3s and the wire attachment regions 21s. The part pattern 22b is formed on the mounting side 11 of the board 2 and the terminal side 12.

In the present embodiment, the wireless antenna 22 is formed in the outer frame region 14 of the mounting side 11. Furthermore, the wireless antenna 22 is formed in the region 23 except for a formed region of the interface terminals 3s and the wire attachment regions of the lead wires for forming the interface terminals 3s in the outer frame region 14 of the terminal side 12.

As having been explained above, the present embodiment makes it possible to enlarge the area of the inner region 17 of the wireless antenna 22, resulting in improvement in the communication characteristic. Furthermore, the present embodiment makes it possible to easily arrange the lead wires for plating and thus to allow the electric field gold plating processing to be easily performed. The electric field gold plating processing can reduce the manufacturing cost in comparison with electroless plating.

The memory card includes a NAND flash memory. The NAND flash memory includes a memory cell array.

A memory cell array formation may be disclosed in U.S. patent application Ser. No. 12/407,403, filed on Mar. 19, 2009, the entire contents of which are incorporated herein by reference.

Furthermore, a memory cell array formation may be disclosed in U.S. patent application Ser. No. 12/406,524, filed on Mar. 18, 2009, the entire contents of which are incorporated herein by reference.

Furthermore, a memory cell array formation may be disclosed in U.S. patent application Ser. No. 12/679,991, filed on Mar. 25, 2010, the entire contents of which are incorporated herein by reference.

Furthermore, a memory cell array formation may be disclosed in U.S. patent application Ser. No. 12/532,030, filed on Mar. 23, 2009, the entire contents of which are incorporated herein by reference.

Furthermore, a memory cell array formation may be disclosed in U.S. patent application Ser. No. 10/155,086, filed on May 28, 2002, the entire contents of which are incorporated herein by reference.

The characteristics of the NAND flash memory will be described below.

(1) In a read operation of the NAND flash memory:

A voltage applied to a word line selected for a reading operation of A-level is between 0 and 0.55 V. However, the voltage is not limited to such a range, and may be any value between any of the following: 0.1 to 0.24 V, 0.21 to 0.31 V, 0.31 to 0.4 V, 0.4 to 0.5 V, and 0.5 to 0.55 V.

A voltage applied to a word line selected for a reading operation of B-level is between 1.5 and 2.3 V. However, the voltage is not limited to such a range, and may be any value between any of the following: 1.65 to 1.8 V, 1.8 to 1.95 V, 1.95 to 2.1 V, and 2.1 to 2.3 V.

A voltage applied to a word line selected for a reading operation of C-level is between 3.0 and 4.0 V. However, the voltage is not limited to such a range, and may be any value between any of the following: 3.0 to 3.2 V, 3.2 to 3.4 V, 3.4 to 3.5 V, 3.5 to 3.6 V, and 3.6 to 4.0 V.

A reading operation time (tR) is between any of the following: 25 to 28 µs, 28 to 70 µs, and 70 to 80 µs, for instance.

(2) A writing operation to the NAND flash memory includes, as stated above, a program operation and a verification operation.

In a write operation, a voltage first applied to a word line selected at the program operation is between 13.7 and 14.3 V. However, the voltage is not limited to this range, and may be any value between any of the following: 13.7 to 14.0 V and 14.0 to 14.6 V, for instance.

It is possible to make different from each other the voltage applied to the selected word line for the first time when writing is executed using an odd-numbered word line and the voltage applied to the selected word line for the first time when writing is executed using an even-numbered word line.

In a case where the program operation belongs to an incremental step pulse program (ISPP) system, a step-up voltage may be about 0.5 V.

A voltage applied to an unselected word line may be 6.0 to 7.3 V, for instance. However, the voltage is not limited to this range, and may be any value between 7.3 and 8.4 V, or 6.0 V or lower.

It is possible to change applied a pass voltage in accordance with whether the unselected word line belongs to the even-numbered word line or the odd-numbered word line.

The writing operation time (tProg) may be between any of the following: 1700 to 1800 µs, 1800 to 1900 µs, and 1900 to 2000 µs, for instance.

(3) In an erasure operation of the NAND flash memory, a voltage first applied to a well is between 12 and 13.6 V, for instance, the well formed above the a semiconductor substrate and memory cells arranged above the well. However, the voltage is not limited to such a range and may be any value between any of the following: 13.6 to 14.8 V, 14.8 to 19.0 V, 19.0 to 19.8 V, and 19.8 to 21.0 V.

An erasure operation time (tErase) may be between any of the following: 3000 to 4000 µs, 4000 to 5000 µs, and 4000 to 9000 µs, for instance.

(4) Memory cell structure of a NAND flash memory:

A semiconductor substrate (for instance, a silicon substrate) includes a charge storage layer via a tunnel insulating layer having a film thickness of 4 to 10 nm. The charge storage layer may have a multilayered structure including an insulating film of SiN or SiON having a film thickness of 2 to 3 nm, and a polysilicon film having a film thickness of 3 to 8 nm. A metal such as Ru may be added to polysilicon. The charge storage layer includes an insulating layer. The insulating layer includes, for instance, a silicon oxide film having a film thickness of 4 to 10 nm, the silicon oxide film held between a lower high-k film having a film thickness of 3 to 10 nm and an upper high-k film having a film thickness of 3 to 10 nm. The high-k film is formed of HfO, for instance. The film thickness of the silicon oxide film may be thicker than the film thickness of the high-k film. A control electrode having a film thickness of 30 to 70 nm is formed on the insulating film via a material having a film thickness of 3 to 10 nm for adjusting of a work function. The material of the work function may be a metal oxide film such as TaO or a metal nitride film such as TaN. The control electrode may be formed using W, for instance.

An air gap may be formed between the memory cells.

In the above-described embodiments, the communication controller 5, the memory controller 7, and the nonvolatile semiconductor memory 6 are individually illustrated. However, the communication controller 5, the memory controller 7, and the nonvolatile semiconductor memory 6 may be freely combined. For example, the communication controller 5, the memory controller 7, and the nonvolatile semiconductor memory 6 may be formed by one chip.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
   a memory;
   a controller electrically connected to the memory, the controller being configured to be capable of communicating with a first outside device;
   a wireless antenna including a first pattern;
   an interface terminal configured to be capable of electrically connecting a second outside device; and
   a board including the interface terminal, the memory and the controller being disposed in a first area of the board, the wireless antenna surrounding the first area, a projection of the first pattern overlapping the interface terminal.

2. The semiconductor memory device of claim 1, further comprising a capacitor configured to adjust a frequency of a current or voltage generated in the wireless antenna by electromagnetic induction at a time of receiving an electric wave.

3. The semiconductor memory device of claim 2, wherein the capacitor adjusts a shift of the frequency generated by the overlapping the projection of the first pattern and the interface terminal.

4. The semiconductor memory device of claim 1, wherein the wireless antenna is an antenna using to near-field communication (NFC).

5. The semiconductor memory device of claim 1, wherein the wireless antenna includes a second pattern formed to a plurality of planes of the board, and a projection of the second pattern does not overlap the interface terminal.

6. The semiconductor memory device of claim 1, wherein the projection of the first pattern overlaps the interface terminal and a wire attachment region of a lead wire.

7. The semiconductor memory device of claim 6, wherein the lead wire is arranged in the wire attachment region when plating and forming the interface terminal.

8. The semiconductor memory device of claim 7, wherein the wire attachment region is disposed between a first region in which the interface terminal is formed and a second region in which a second pattern of the wireless, antenna is formed, the first and second regions being arranged in a terminal side of the board.

9. The semiconductor memory device of claim 7, wherein the wireless antenna includes a second pattern formed to a plurality of planes of the board, and a projection of the second pattern overlaps neither the interface terminal nor the wire attachment region.

10. The semiconductor memory device of claim 1, wherein the controller receives a signal based on an electric wave from the first outside device.

11. The semiconductor memory device of claim 1, further comprising:
    a nonvolatile semiconductor memory; and
    a memory controller configured to write writing data to the nonvolatile semiconductor memory when the memory controller receives a write command and the writing data from the second outside device via the interface terminal and the controller, and read reading data from the nonvolatile semiconductor memory and transfers the reading data via the controller and the interface terminal to the second outside device when the memory controller receives a read command from the second outside device via the interface terminal and the controller.

12. The semiconductor memory device of claim 1, wherein the memory is operable by electrical power generated in the wireless antenna, and
    the controller is operable by electrical power generated in the wireless antenna, reads data written to the memory when receiving a read command from the first outside device via the wireless antenna, and outputs the data to the first outside device via the wireless antenna.

13. The semiconductor memory device of claim 1, wherein the memory is operable by electrical power generated in the wireless antenna, and
    the controller is operable by electrical power generated in the wireless antenna, and writes the data to the memory when receiving a write command and data from the first outside device via the wireless antenna.

14. The semiconductor memory device of claim 1, wherein the interface terminal is covered with metal.

15. A semiconductor memory device comprising:
    a memory;
    a controller electrically connected to the memory, the controller being configured to be capable of communicating with a first outside device;
    a wireless antenna including a first pattern and a second pattern;
    an interface terminal configured to be capable of electrically connecting a second outside device; and
    a board including the interface terminal, the memory and the controller being disposed in a first area of the board, the wireless antenna surrounding the first area, a projection of the first pattern overlapping the interface terminal, the second pattern being formed without overlapping the interface terminal and the projection of the interface terminal and formed to a plurality of planes of the board.

16. The semiconductor memory device of claim 15, wherein the interface terminal is covered with metal.

* * * * *